US011620632B2

(12) United States Patent
Koeppel

(10) Patent No.: US 11,620,632 B2
(45) Date of Patent: *Apr. 4, 2023

(54) WEARABLE DEVICE FOR EVENT ACCESS, PAYMENT FOR OFFLINE TRANSACTIONS AT THE EVENT, AND VISUAL LIGHT DISPLAY

(71) Applicant: Capital One Services, LLC, McLean, VA (US)

(72) Inventor: Adam Koeppel, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/580,842

(22) Filed: Jan. 21, 2022

(65) Prior Publication Data

US 2022/0147997 A1    May 12, 2022

Related U.S. Application Data

(63) Continuation of application No. 17/301,818, filed on Apr. 15, 2021, now Pat. No. 11,250,415, which is a
(Continued)

(51) Int. Cl.
| | |
|---|---|
| *G06Q 20/32* | (2012.01) |
| *G06K 19/07* | (2006.01) |
| *G06Q 20/34* | (2012.01) |
| *G06K 7/10* | (2006.01) |
| *G06K 19/077* | (2006.01) |

(Continued)

(52) U.S. Cl.
CPC ..... *G06Q 20/3278* (2013.01); *G06K 7/10297* (2013.01); *G06K 19/0727* (2013.01); *G06K 19/07762* (2013.01); *G06Q 20/102* (2013.01); *G06Q 20/204* (2013.01); *G06Q 20/325* (2013.01); *G06Q 20/346* (2013.01); *G06Q 20/349* (2013.01); *G06Q 20/352* (2013.01); *G06Q 20/367* (2013.01)

(58) Field of Classification Search
CPC .................. G06Q 20/3278; G06K 19/07762
USPC ...................................................... 235/380
See application file for complete search history.

(56) References Cited

U.S. PATENT DOCUMENTS

| | | |
|---|---|---|
| 10,134,026 B1 | 11/2018 | Koeppel |
| 10,332,100 B1 | 6/2019 | Koeppel |

(Continued)

FOREIGN PATENT DOCUMENTS

WO    2016134470 A1    9/2016

*Primary Examiner* — Toan C Ly
(74) *Attorney, Agent, or Firm* — Harrity & Harrity, LLP

(57) ABSTRACT

A wearable device receives ticket information for an event and information indicating a quantity of funds allocated from an account, associated with a user of a user device, to the wearable device, and stores the ticket information and the information indicating the quantity of funds. The wearable device utilizes a wireless component to pair the wearable device and the user device, and provides, to the user device and via the wireless component, the ticket information and information indicating access privileges for the event. The wearable device generates a token for a PoS device for a charge incurred at the event during an offline transaction with the PoS device, and provides, via a NFC component, the token to the PoS device. The wearable device provides, to the user device and via the wireless component, information indicating that that the token was provided to the PoS device.

20 Claims, 12 Drawing Sheets

Related U.S. Application Data continuation of application No. 16/824,961, filed on Mar. 20, 2020, now Pat. No. 10,990,960, which is a continuation of application No. 16/443,166, filed on Jun. 17, 2019, now Pat. No. 10,600,047, which is a continuation of application No. 16/157,617, filed on Oct. 11, 2018, now Pat. No. 10,332,100, which is a continuation of application No. 15/922,595, filed on Mar. 15, 2018, now Pat. No. 10,134,026.

(51) Int. Cl.
*G06Q 20/10* (2012.01)
*G06Q 20/36* (2012.01)
*G06Q 20/20* (2012.01)

(56) References Cited

U.S. PATENT DOCUMENTS

| | | |
|---|---|---|
| 10,600,047 B2 | 3/2020 | Koeppel |
| 10,878,402 B1 | 12/2020 | Blackie et al. |
| 10,990,960 B2 | 4/2021 | Koeppel |
| 2012/0024947 A1 | 2/2012 | Naelon et al. |
| 2013/0262298 A1 | 10/2013 | Morley et al. |
| 2014/0184386 A1 | 7/2014 | Regler et al. |
| 2015/0041547 A1 | 2/2015 | Sofoulis et al. |
| 2015/0294303 A1 | 10/2015 | Hanson et al. |
| 2015/0339664 A1 | 11/2015 | Wong et al. |
| 2016/0267310 A1 | 9/2016 | Alnasser et al. |
| 2018/0139597 A1 | 5/2018 | Labrosse et al. |
| 2018/0181954 A1 | 6/2018 | Sinton et al. |
| 2018/0182193 A1 | 6/2018 | Spittle et al. |
| 2018/0241864 A1 | 8/2018 | Males et al. |
| 2021/0233060 A1 | 7/2021 | Koeppel |

WEARABLE DEVICE FOR EVENT ACCESS, PAYMENT FOR OFFLINE TRANSACTIONS AT THE EVENT, AND VISUAL LIGHT DISPLAY

RELATED APPLICATIONS

This application is a continuation of U.S. patent application Ser. No. 17/301,818, filed Apr. 15, 2021, which is a continuation of U.S. patent application Ser. No. 16/824,961, filed Mar. 20, 2020 (now U.S. Pat. No. 10,990,960), which is a continuation of U.S. patent application Ser. No. 16/443,166, filed Jun. 17, 2019 (now U.S. Pat. No. 10,600,047), which is a continuation of U.S. patent application Ser. No. 16/157,617, filed Oct. 11, 2018 (now U.S. Pat. No. 10,332,100), which is a continuation of U.S. patent application Ser. No. 15/922,595, filed Mar. 15, 2018 (now U.S. Pat. No. 10,134,026), the contents of which are incorporated herein by reference in their entireties.

BACKGROUND

Consumers attend large events, such as a concert, a festival (e.g., a music festival), an event at a university, a sporting event, an event at a theme park, a trade show, and/or the like. Consumers may not wish to carry transaction cards (e.g., credit cards, debit cards, and/or the like) to such events, or such events may not accept transaction cards.

Some organizers of events provide a wearable band that includes ticket information and that may be linked to a prepaid transaction card. However, these wearable bands can only perform transactions when connected to a network, such as cellular network, a data network, and/or the like. In addition, these wearable bands do not provide the ability to check a balance of the prepaid transaction card. Furthermore, the wearable band does not permit the consumer to add funds to the prepaid transaction card linked to the wearable band. Thus, these wearable bands solely serve the function of providing ticket information at an event.

SUMMARY

According to some implementations, a wearable device may include a near-field communication (NFC) component, a wireless component, one or more memories, and one or more processors, communicatively coupled to the one or more memories, to receive ticket information associated with an event and information indicating a quantity of funds allocated from an account, associated with a user of a user device, to the wearable device. The one or more processors may store the ticket information and the information indicating the quantity of funds in the one or more memories, and may utilize the wireless component to pair the wearable device and the user device based on a request to pair that is received from the user device. The one or more processors may provide, to the user device and via the wireless component, wearable device information, where the wearable device information includes at least the ticket information, and information indicating access privileges associated with the event. The one or more processors may generate a token for a point of sale device for a charge incurred at the event during an offline transaction with the point of sale device, and may provide, via the NFC component, the token to the point of sale device, the point of sale device to utilize the token to receive payment for the charge from the account associated with the user, at a later time and via an online transaction. The one or more processors may provide, to the user device and via the wireless component, information indicating that that the token was provided to the point of sale device, the user device to update the account based on the charge.

According to some implementations, a method may include storing, by a wearable device, ticket information associated with an event and information indicating a quantity of funds allocated from an account, associated with a user of a user device, to the wearable device, where the ticket information and the information indicating the quantity of funds being received from one or more devices associated with the event, and the wearable device includes a near-field communication (NFC) component, and a wireless component. The method may include receiving, via the wireless component of the wearable device, a request to pair from the user device, and pairing, via the wireless component of the wearable device, the user device and the wearable device based on the request to pair. The method may include receiving, via the NFC component of the wearable device, a signal from a point of sale device, where the signal indicates a charge incurred at the event during an offline transaction with the point of sale device, and generating, by the wearable device and based on the signal, a token for the charge incurred at the event during the offline transaction with the point of sale device. The method may include providing, via the NFC component of the wearable device, the token to the point of sale device, the point of sale device to utilize the token to receive payment for the charge from the account associated with the user, at a later time and via an online transaction, and providing, to the user device and via the wireless component of the wearable device, information indicating that that the token was provided to the point of sale device, the user device to update the account based on the charge.

According to some implementations, a non-transitory computer-readable medium may store instructions that include one or more instructions that, when executed by one or more processors of a wearable device that includes a near-field communication (NFC) component, a wireless component, and a security component, cause the one or more processors to store ticket information associated with an event and information indicating a quantity of funds allocated from an account, associated with a user attending the event, to the wearable device. The one or more instructions may cause the one or more processors to receive, via the wireless component, a request to pair the wearable device and a user device associated with the user, and pair, via the wireless component, the wearable device and the user device based on the request to pair. The one or more instructions may cause the one or more processors to provide, to the user device and via the wireless component, the information indicating the quantity of funds allocated from the account to the wearable device, and receive, via the NFC component, a signal from a point of sale device, where the signal indicates a charge incurred at the event, no online communication are provided at the event for the wearable device, the user device, and the point of sale device, and the charge is incurred during an offline transaction with the point of sale device. The one or more instructions may cause the one or more processors to generate, by the security component and based on the signal, a token for the charge incurred at the event during the offline transaction with the point of sale device, and provide, via the NFC component, the token to the point of sale device, the point of sale device to utilize the token to receive payment for the charge from the account associated with the user, at a later time and via an online transaction. The one or more instructions may cause the one or more processors to provide, to the user device and via the wireless component, information indicating that that the token was provided to the point of sale device, the user device to update the account based on the charge.

DETAILED DESCRIPTION

The following detailed description of example implementations refers to the accompanying drawings. The same reference numbers in different drawings may identify the same or similar elements.

Some implementations described herein include a wearable device that provides access to an event, pays for offline transactions at the event, and provides a visual light display. The wearable device may include a wireless component, a near-field communication (NFC) component, a security element, a network receiver component, and multiple light-emitting diodes (LEDs). The wireless component may enable the wearable device to connect to a user device (e.g., a mobile phone) so that a user of the wearable device may check a balance of funds available to the wearable device and may add to the balance of funds. The NFC component and the security element may enable the wearable device to be used to pay for offline transactions at the event. The network receiver component and the multiple LEDs may enable the wearable device to provide a variety of light displays that may be synchronized to sounds (e.g., music) associated with the event.

Figure 1A:
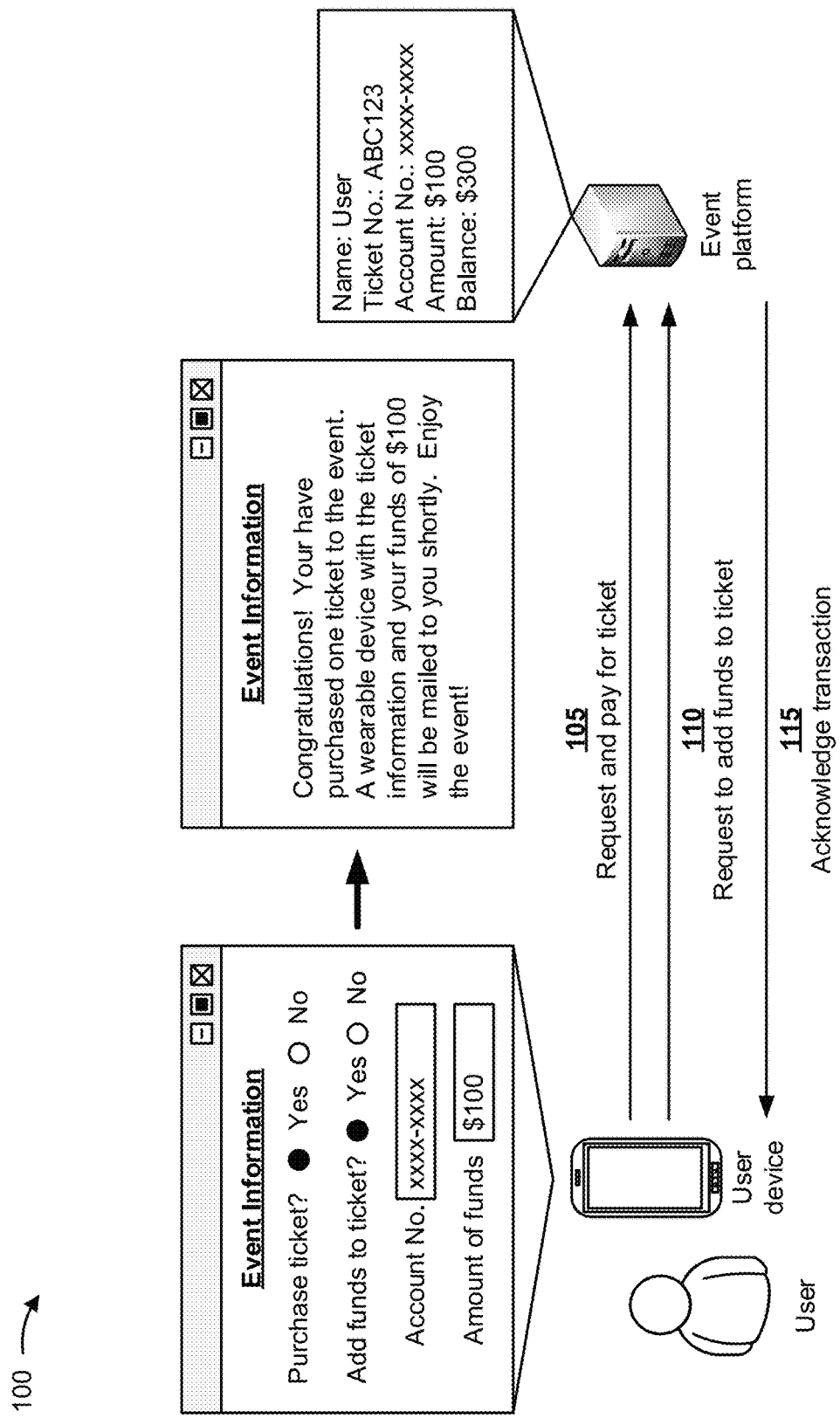
FIGS. 1A-1I are diagrams of an overview of an example implementation described herein.

FIGS. 1A-1I are diagrams of an overview of an example implementation 100 described herein. As shown in FIG. 1A, a user device may be associated with a user and an event platform. The user may utilize the user device to purchase a ticket for an event and to add funds to the ticket. For example, the user device may provide a user interface that enables the user to purchase the ticket, add funds to the ticket, provide an account (e.g., xxxx-xxxx) to use for purchasing the ticket and for adding the funds, provide an amount of funds (e.g., $100) to add to the ticket, and/or the like. In some implementations, the event may include a concert, a festival (e.g., a music festival), an event at a university, a sporting event, an event at a theme park, a trade show, and/or the like.

As further shown in FIG. 1A, and by reference number 105, the user device may provide, to the event platform, a request for the ticket and the account to utilize for purchasing the ticket. In some implementations, the account may include a bank account, a credit card account, a debit card account, and/or the like of the user. As further shown in FIG. 1A, and by reference number 110, the user device may provide, to the event platform, a request to add funds to the ticket. For example, the request to add funds may indicate that the user wishes to add $100 to the ticket and wishes to add the funds to the ticket from the account associated with the user.

In some implementations, the event platform may receive the request for the ticket, the account to utilize for purchasing the ticket, and the request to add funds to the ticket. The event platform may charge the account for the ticket, and may generate a ticket number (e.g., ABC123) based on the request for the ticket and the account to utilize for purchasing the ticket. The event platform may charge the amount of funds (e.g., $100) to the account, and may add the funds to the ticket. In some implementations, the ticket may be in the form of a wearable device, such as a device affixed to a wristband, a device affixed to a lanyard, a device affixed to a backpack, and/or the like. In some implementations, the wearable device may not include any information (e.g., ticket information, monetary value, and/or the like), and the user may load information on the wearable device (e.g., via the user device).

As further shown in FIG. 1A, and by reference number 115, the event platform may acknowledge the transaction by providing an acknowledgement to the user device. In some implementations, the acknowledgement may indicate that the user has purchased one ticket to the event, and that a wearable device with the ticket information and the funds of $100 will be mailed to the user. The user device may receive the acknowledgment, and may display the acknowledgment to the user.

Figure 1B:
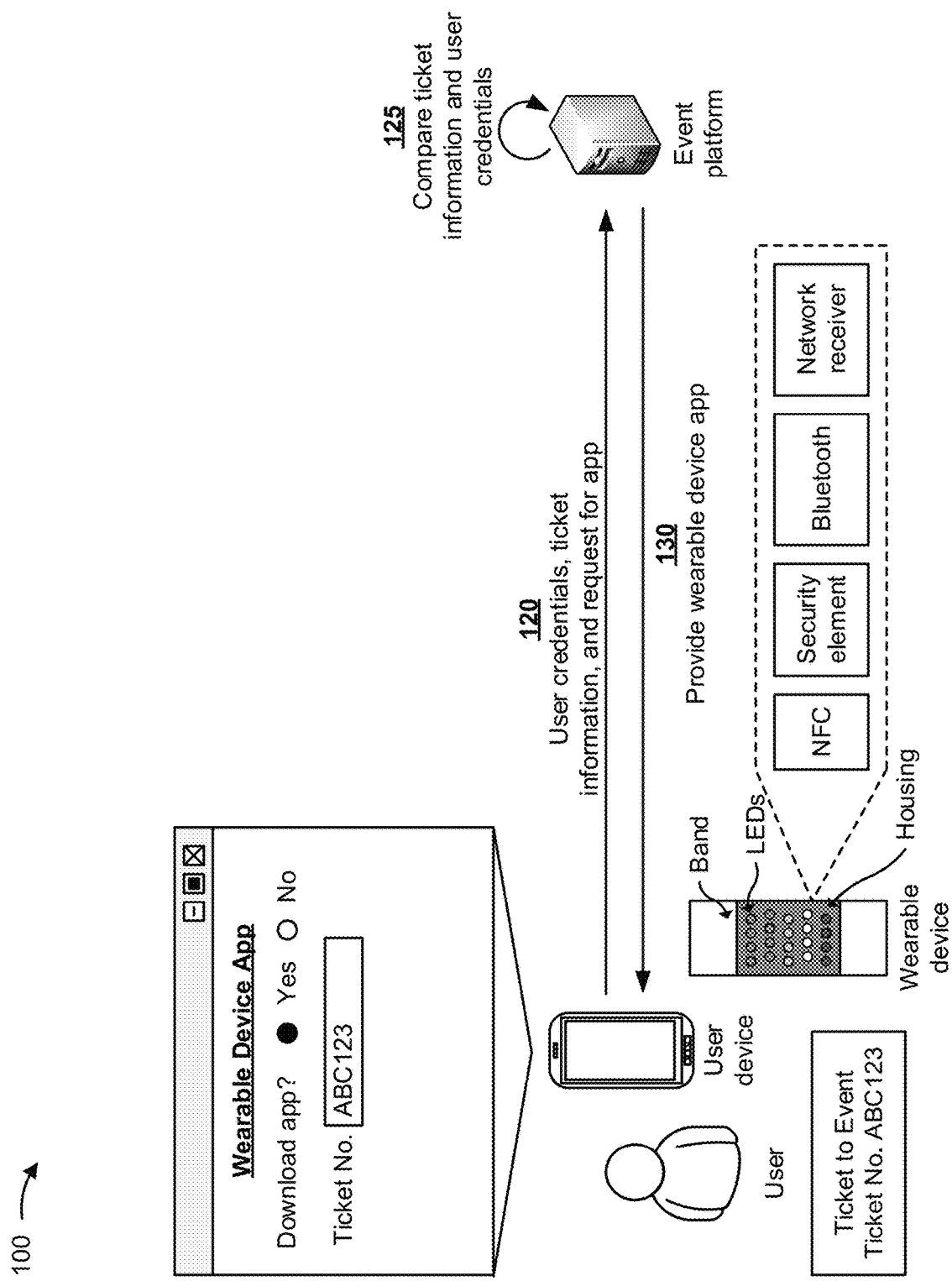

As shown in FIG. 1B, the user may receive a wearable device and a ticket to the event based on purchasing the ticket. In some implementations, the wearable device may include the ticket information (e.g., the ticket number ABC123) and information indicating the funds (e.g., $100) available to the wearable device. In some implementations, the wearable device may include a band to be worn around a wrist of the user and a housing connected to the band. Alternatively, the housing of the wearable device may be connected to a mechanism other than the band, such as a lanyard, a connector for connecting to a backpack or an article of clothing, and/or the like. As further shown in FIG. 1B, the housing may support multiple LEDs, and may house a NFC component, security element, a wireless component (e.g., a Bluetooth component), and a network receiver component, as described elsewhere herein.

As further shown in FIG. 1B, the user may utilize the user device to request a wearable device application that enables the user device to communicate with the wearable device. In some implementations, the user may be required to provide the ticket number (e.g., ABC123) in order receive the wearable device application. As further shown in FIG. 1B, and by reference number 120, the user may utilize the user device to provide user credentials (e.g., provided by the user device, such as a telephone number associated with the user device), the ticket information (e.g., the ticket number), and a request for the wearable device application to the event platform. The event platform may receive the user credentials, the ticket information, and the request for the wearable device application.

As further shown in FIG. 1B, and by reference number 125, the event platform may compare the ticket information and the user credentials to determine whether the request for the wearable device application is legitimate. In some implementations, if the ticket information does not correlated with the user credentials, the event platform may not provide the wearable device application to the user device. In some implementations, and as shown by reference number 130, if the ticket information correlates with the user credentials, the event platform may provide the wearable device application to the user device. The user device may receive the wearable device application, and may install the wearable device application on the user device.

Figure 1C:
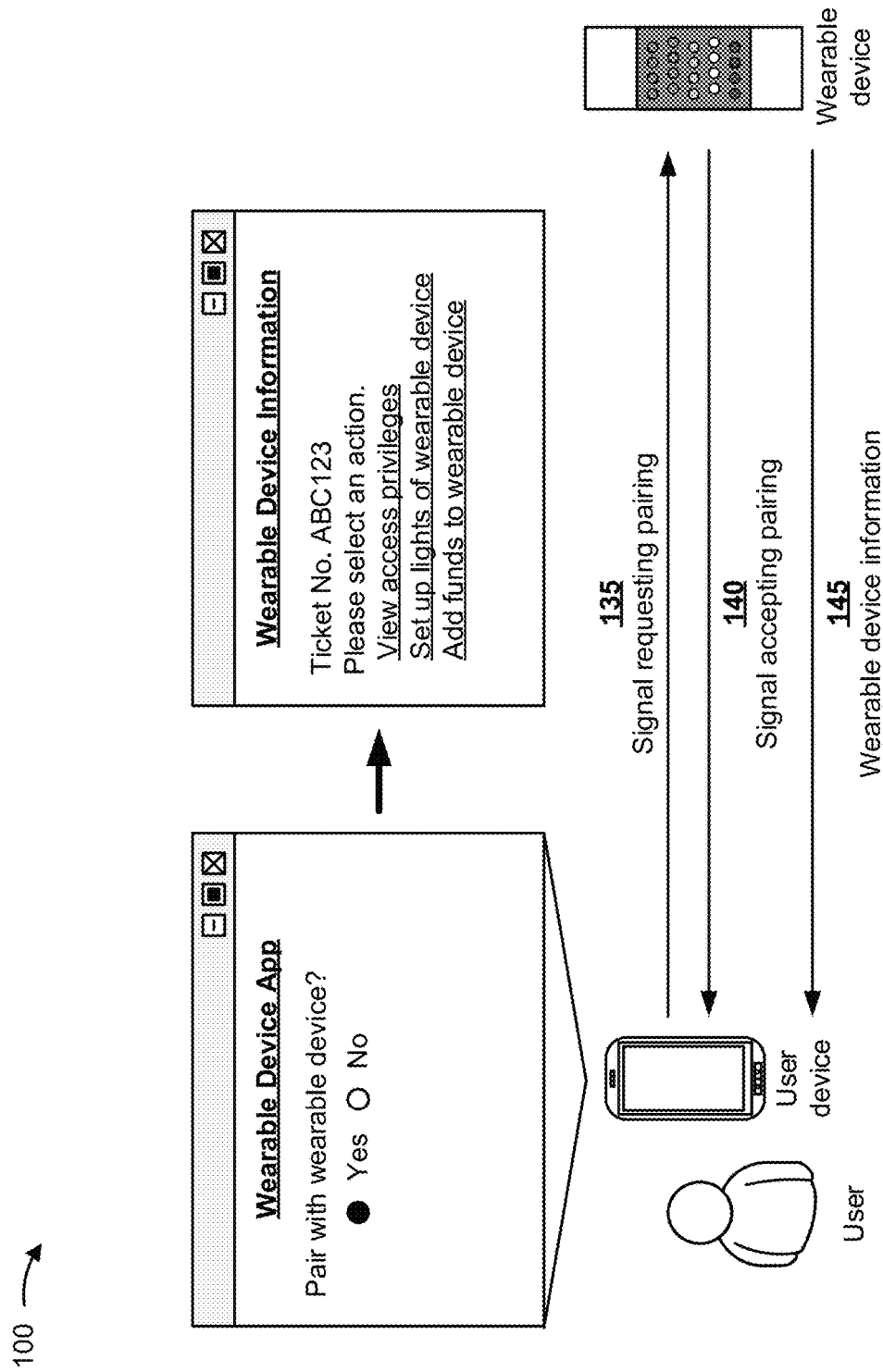

As shown in FIG. 1C, the user device may execute the wearable device application, and the wearable device application may provide a user interface that inquires whether the user wants to pair the user device with the wearable device. In some implementations, and as shown by reference number 135, if the user wants to pair the user device with the wearable device, the wearable device application may cause the user device to provide, to the wearable device, a signal requesting pairing with the wearable device. In some implementations, the wireless component of the wearable device may receive the signal requesting the pairing. In some implementations, and as shown by reference number 140, the wearable device may automatically accept the pairing with the user device and may provide a signal, indicating that the pairing is accepted, to the user device. In such implementations, the user device and the wearable device may be paired and may communicate with each other. In some implementations, the wearable device may require provision of the ticket information or some other verification before pairing with the user device.

As further shown in FIG. 1C, and by reference number 145, once the wearable device and the user device are paired, the wearable device may provide wearable device information to the user device. The user device may receive the wearable device information, and may provide the wearable device information for display to the user. In some implementations, the wearable device information may include the ticket number (e.g., ABC123) associated with the wearable device, an amount of funds allocated to the wearable device, information indicating event access privileges, information enabling the user device to set up the lights (e.g., the LEDs) of the wearable device, information enabling the user device add funds to the wearable device, and/or the like. As further shown in FIG. 1C, the user may utilize the wearable device application to select particular wearable device information and view detailed information associated with the particular wearable device information.

Figure 1D:
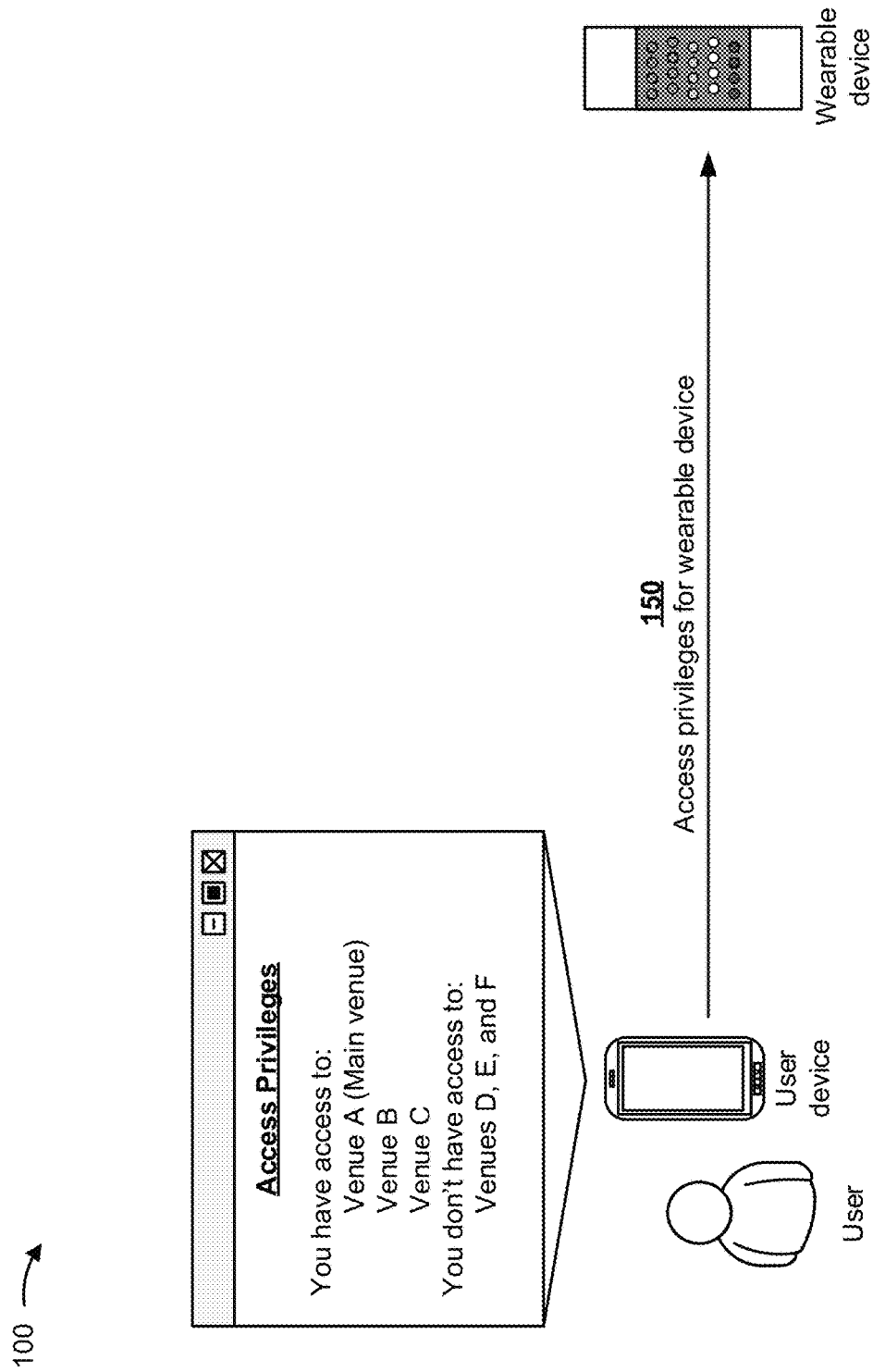

For example, as shown in FIG. 1D, assume that the user utilizes the wearable device application to select the information indicating the event access privileges. In such an example, and as shown by reference number 150, when the user selects the information indicating the event access privileges, the user device may provide, to the wearable device, information indicating access privileges for the wearable device at the event. The user device may provide, for display to the user, the information indicating the access privileges for the wearable device at the event. In some implementations, the information indicating the access privileges for the wearable device at the event may include information indicating that the wearable device provides the user access to venues A-C at the event, and that the wearable device does not provide the user access to venues D-F at the event.

In some implementations, the wearable device application may enable the user to configure the wearable device a variety of ways. For example, if the wearable device is utilized by a child at an amusement park, the wearable device may provide tracking information to a user device of a parent (e.g., via the wearable device application) so that the parent may locate the child. In such an example, the tracking information may be provided by the wireless component of the wearable device based on a signal being received at a location in the amusement park when the wearable device passes by the location. In another example, the parent may utilize the wearable device application to control what may be purchased with the wearable device by the child. In such an example, the parent may control food consumption of the child (e.g., so that that child cannot purchase junk food with the wearable device) by preventing the wearable from being utilized to pay for particular foods.

Figure 1E:
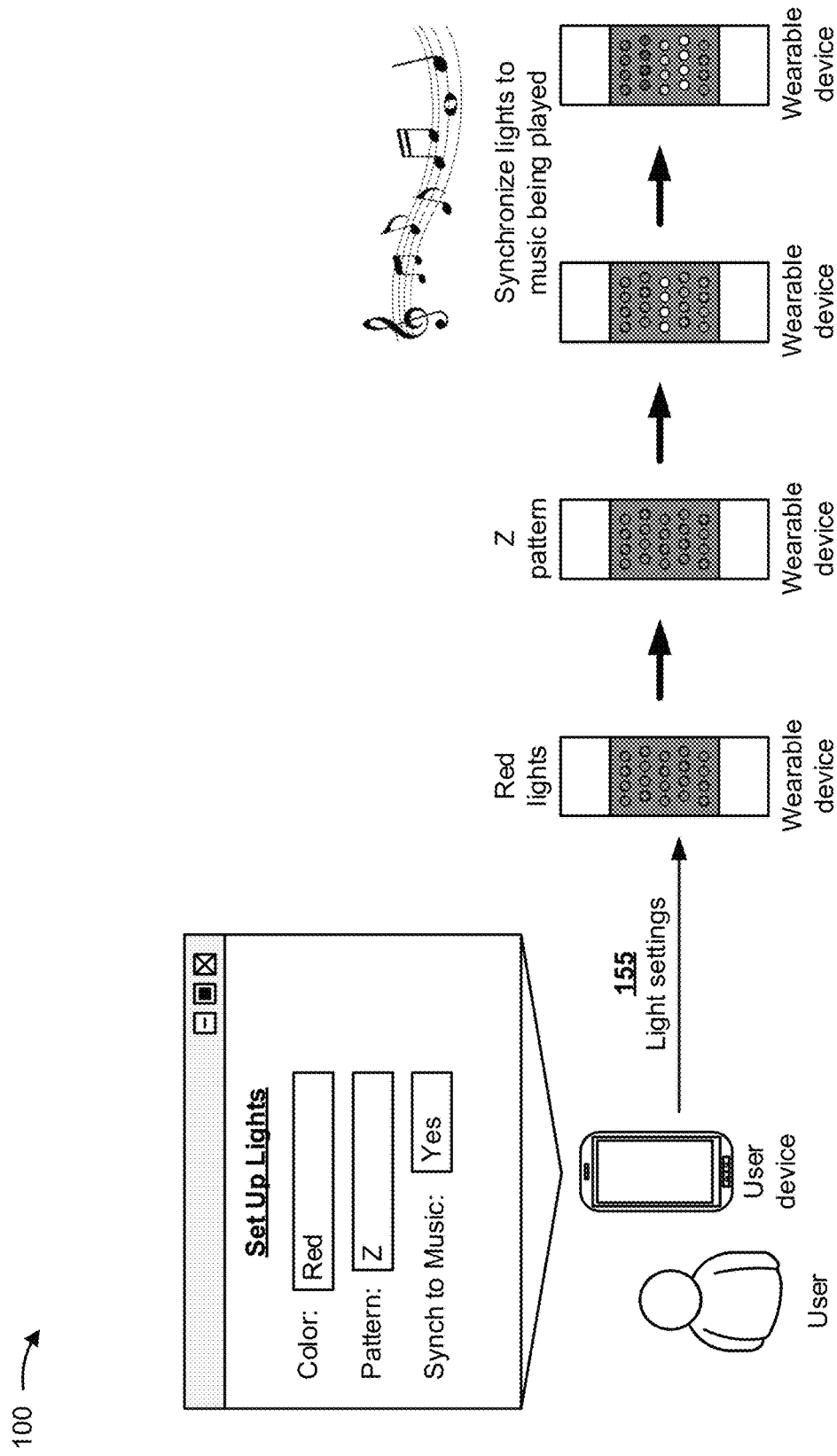

As shown in FIG. 1E, now assume that the user utilizes the wearable device application to select the information enabling the user device to set up the lights of the wearable device. When the user selects the information enabling the user device to set up the lights of the wearable device, the user device may provide for display light settings that the user may specify. For example, the user may specify light settings associated with a color of the lights (e.g., Red), a pattern for the lights (e.g., a Z pattern), synchronization of the lights with music, and/or the like. As further shown in FIG. 1E, and by reference number 155, the user device may provide the light settings to the wearable device. In some implementations, the light settings may cause the wearable device to display a particular color (e.g., Red) or multiple colors. Such implementations may enable the user to locate friends at a crowded event without sufficient lighting. In some implementations, the light settings may cause the wearable device to display a particular pattern (e.g., a Z pattern) or multiple patterns. Such implementations may enable the user to locate friends at a crowded event, may provide an indicator for a group of people at the event, and/or the like.

In some implementations, the light settings may cause the wearable device to synchronize a display of the lights with music being played at the event (e.g., a concert, a music festival, and/or the like). In such implementations, the network receiver component of the wearable device may connect with a network that provides information associated with the music being played at the event. The information associated with the music being played may cause different lights of the wearable device to be illuminated at different times. Such implementations may provide a unique and fun experience for the user at the event.

Figure 1F:
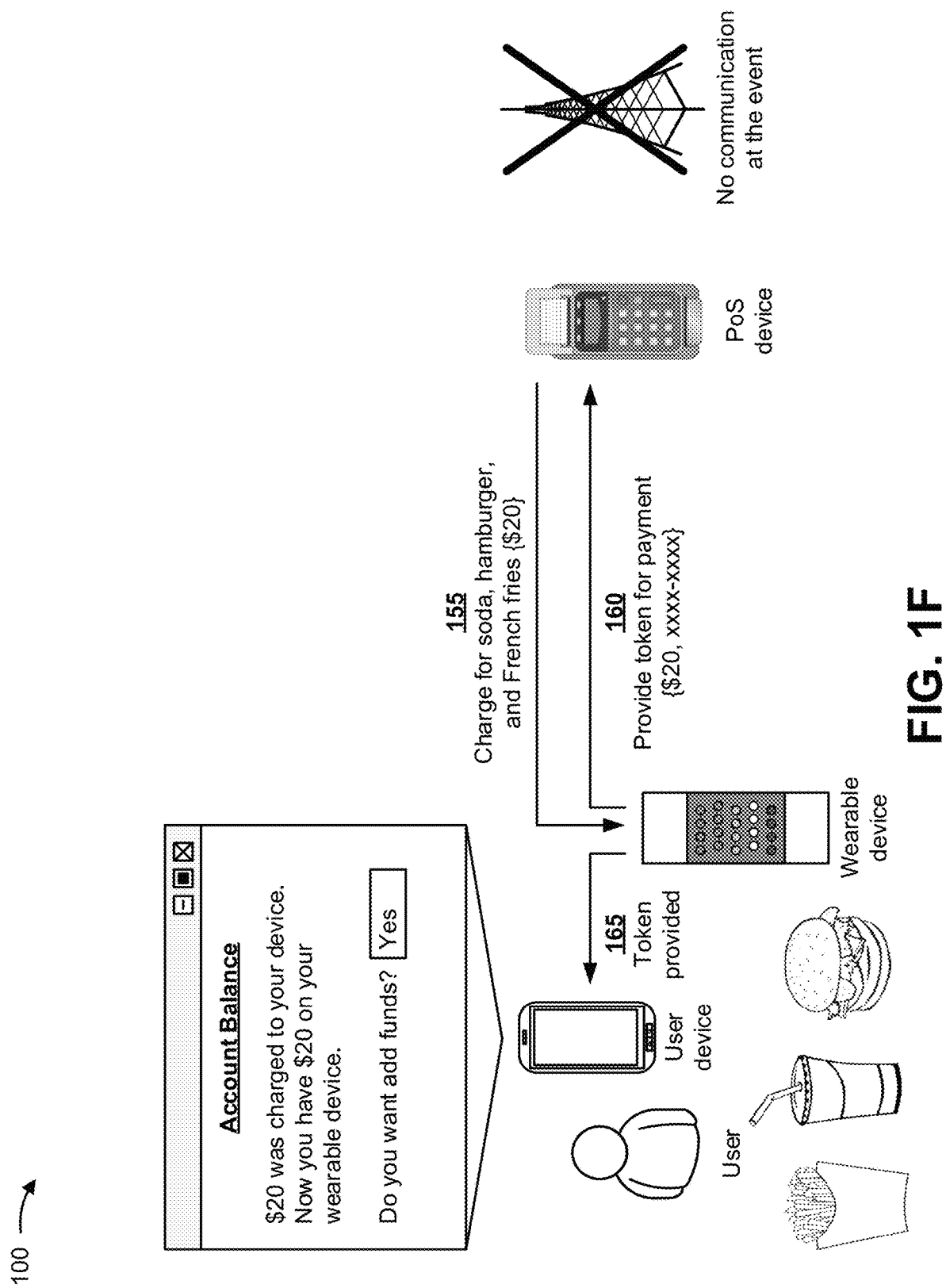

As shown in FIG. 1F, the user may purchase a soda, a hamburger, and French fries from a vendor at the event. As further shown, the vendor may be associated with a point of sale (PoS) device, and there may be no network communication at the event. Thus, the sale of the soda, the hamburger, and the French fries to the user may be an offline transaction. The user may utilize the wearable device to pay for the soda, the hamburger, and the French fries. As further shown in FIG. 1F, and by reference number 155, the PoS device may provide a charge (e.g., $20) for the soda, the hamburger, and the French fries to the wearable device, and the NFC component of the wearable device may receive the charge.

In some implementations, the receipt of the charge by the NFC component of the wearable device may cause the security element of the wearable device to generate a secure token as payment for the charge. As further shown in FIG. 1F, and by reference number 160, the wearable device may provide the secure token to the PoS device as payment for the charge. In some implementations, the secure token may include information identifying the account (e.g., xxxx-xxxx) associated with the wearable device and an amount to charge the account (e.g., $20). In some implementations, the PoS device may receive the secure token, but may be unable to redeem the token and receive payment since there is no network communication at the event. However, the PoS device may store the secure token, and may utilize the secure token to receive payment at a later time when the PoS device is connected to a network.

As further shown in FIG. 1F, and by reference number 165, the wearable device may provide, to the user device, information indicating that the secure token was provided to the PoS device. The user device may receive the information, and may deduct the amount paid (e.g., $20) by the wearable device from the funds allocated to the wearable device. For example, if the wearable had $40 allocated to it prior to the purchase, the user device may deduct the $20 from the $40 to arrive at a balance of $20 remaining on the wearable device. As further shown in FIG. 1F, the user device may provide, for display to the user, information indicating that $20 was charged to the wearable device, and that a balance of $20 remains on the wearable device. The user device may also display to the user information requesting whether the user wishes to allocate more funds to the wearable device. In some implementations, the user may wish to allocate more funds to the wearable device, and may indicate this desire via the user device.

Figure 1G:
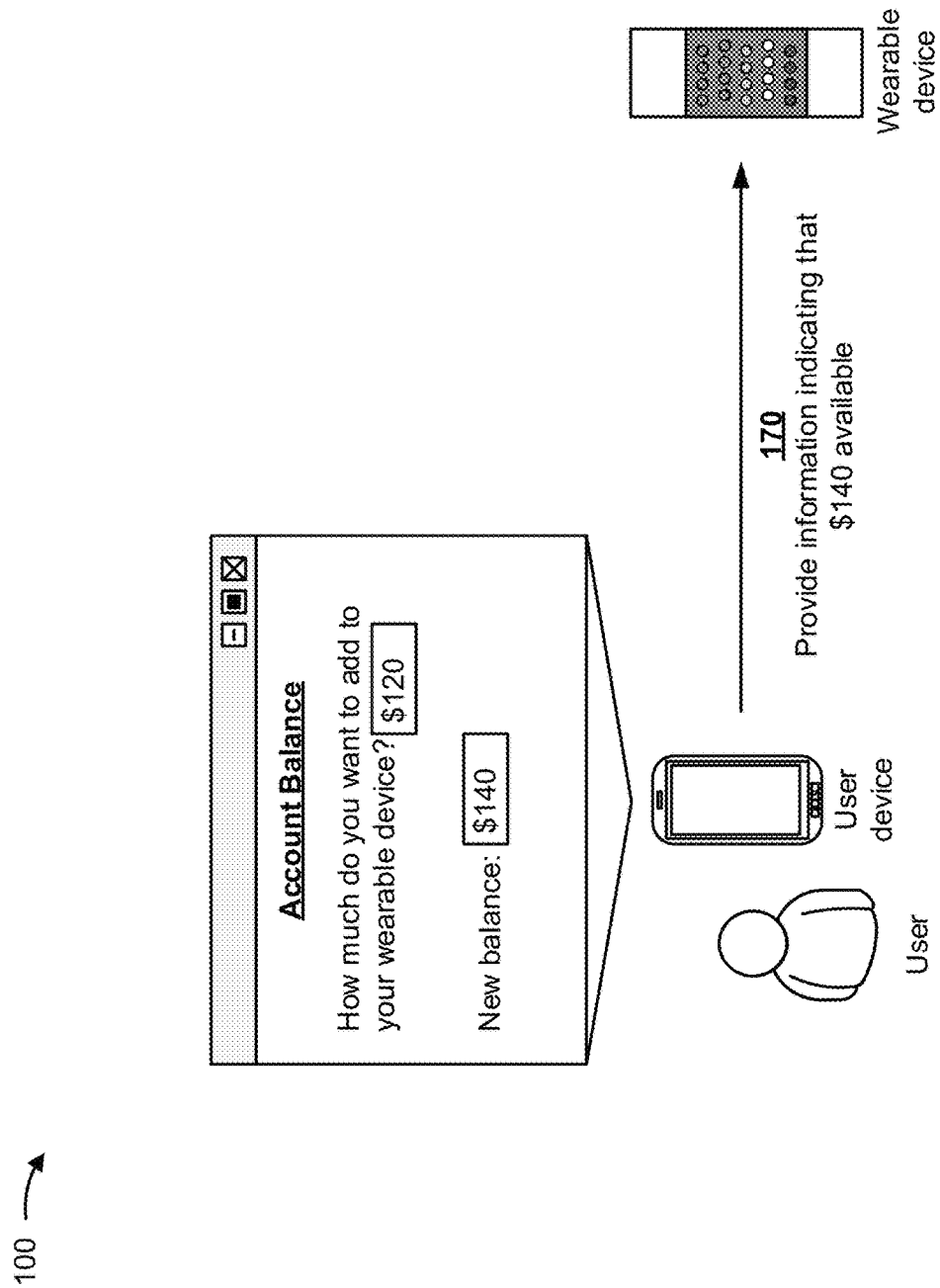

As shown in FIG. 1G, based on the desire of the user to allocate more funds to the wearable device, the user device may provide, for display to the user, information requesting an amount of funds to allocate to the wearable device. In some implementations, the user may indicate that the user wishes to allocate a particular amount (e.g., $120) to the wearable device, and the user device may update the balance on the wearable device (e.g., to $140) based the user allocating the $120 to the wearable device. As further shown in FIG. 1G, and by reference number 170, the user device may provide, to the wearable device, information indicating that the wearable device has $140 available for purchases at the event. The wearable device may receive the information indicating that the wearable device has $140 available for purchases at the event. In some implementations, the user device may be unable to connect with the account associated with the wearable device and allocate the $120 since there is no network communication at the event. However, the user device may store information indicating that $120 was allocated to the wearable device, and may utilize such information to withdraw the $120 from the account at a later time when the user device is connected to a network.

Figure 1H:
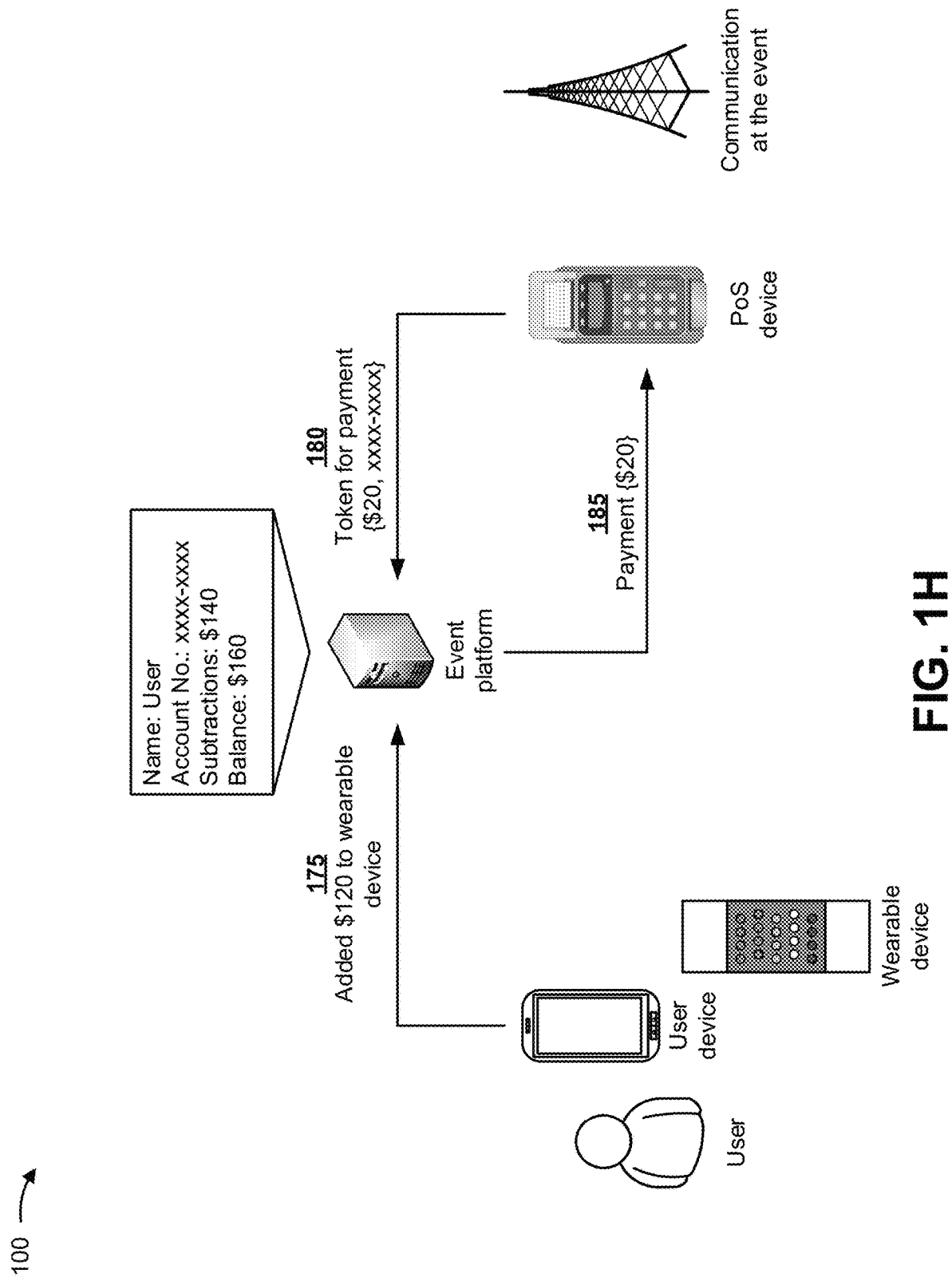

As shown in FIG. 1H, assume that communication with a network is restored at a later time, and that the user device and the PoS device may communicate with the network. In some implementations, and based on the communication with the network, the PoS device may be able to reconcile the purchase (e.g., $20) with the event platform, and the user device may be able to reconcile the allocation of funds (e.g., $120), to the wearable device, with the event platform. As further shown in FIG. 1H, and by reference number 175, the user device may provide, to the event platform, information indicating that $120 from the account was allocated to the wearable device. As further shown in FIG. 1H, and by reference number 180, the PoS device may provide, to the event platform, the secure token indicating that $20 from the account was used to purchase the soda, the hamburger, and the French fries.

In some implementations, the event platform may receive the information indicating that $120 from the account was allocated to the wearable device, and the secure token, and may deduct $140 from the account. The $140 deduction from the account may leave $160 in the account (e.g., $300-$140). As further shown in FIG. 1G, and by reference number 185, the event platform may provide payment (e.g., $20) from the account to the PoS device. The PoS device may receive the payment.

Figure 1I:
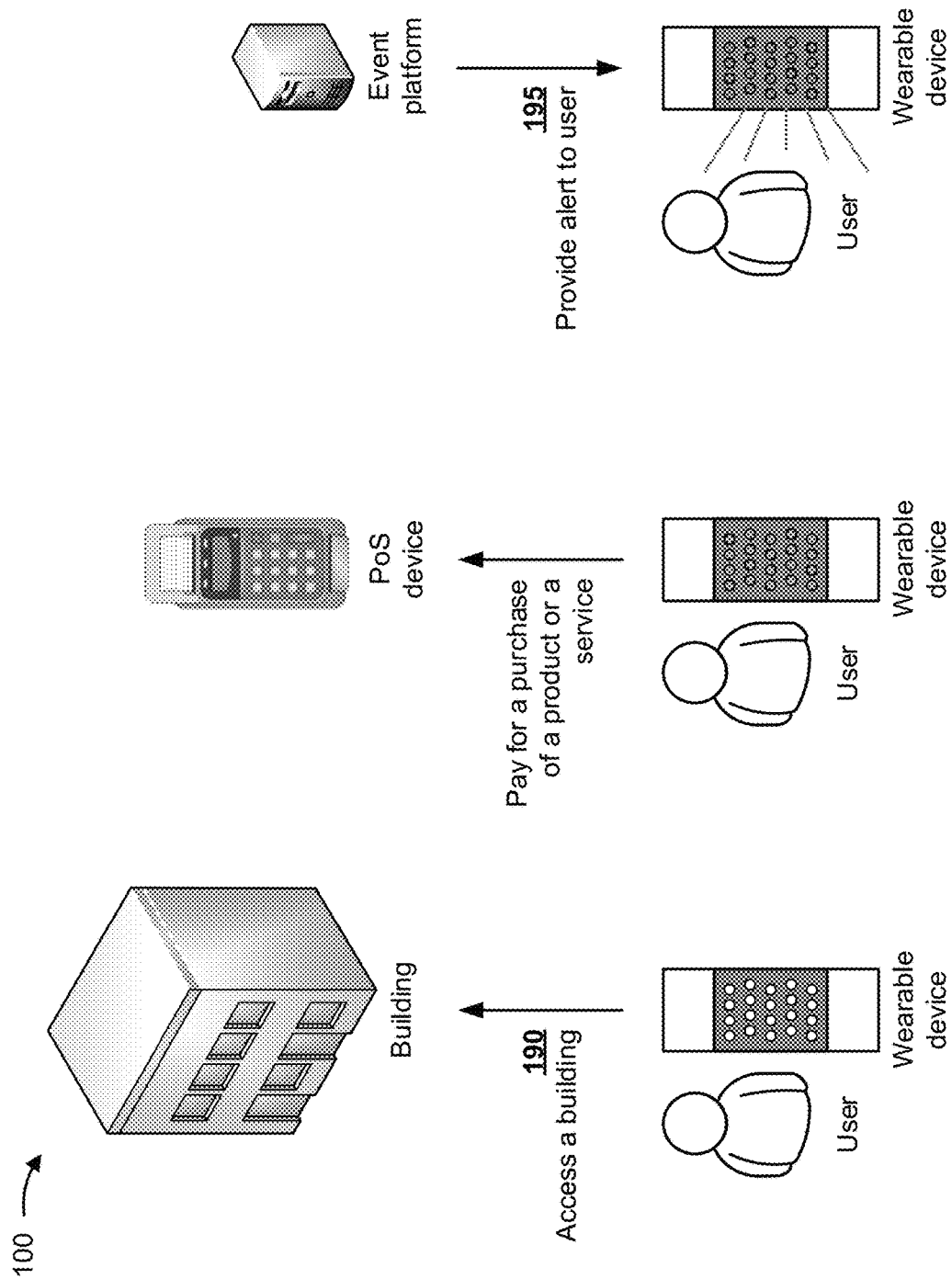

As shown in FIG. 1I, and by reference number 190, the user may utilize the wearable device to access a building associated with an entity (e.g., a company, a government agency, an academic institution, and/or the like). In some implementations, the wearable device may provide credentials associated with the user, and the credentials may be utilized to enable the user to access the building. In some implementations, the user may utilize the wearable device to access a portion of a building (e.g., a laboratory of a building, a research and development portion of a building, and/or the like). As further shown in FIG. 1I, the user may utilize the wearable device to pay for a purchase of a product and/or a service provided by the entity. For example, the user may utilize the wearable device to purchase food, to purchase books, and/or the like.

As further shown in FIG. 1I, and by reference number 195, the event platform may provide information associated with an alert to the user, via the wearable device. In some implementations, the alert may be associated with the entity, and may include an alert about a security breach associated with the entity, an alert about an emergency situation (e.g., a weather emergency, a fire emergency, a crime, and/or the like), an alert about a celebration (e.g., an employee's birthday, a student and teacher function, and/or the like), and/or the like. The wearable device may receive the information associated with the alert, and may display the information associated with the alert via visual and/or tactile feedback.

The implementations described in connection with FIG. 1I may be provided by the same wearable device and may eliminate a need for having different mechanisms for security purposes, for payment purposes, and for alerts associated with the entity. In the implementations described in connection with FIG. 1I, the wearable device may communicate with a network, and may be associated with the user device for security purposes (e.g., to provide secondary authentication for accessing a building).

In this way, several different stages of a transaction process are automated and performed in an offline manner, which may remove waste from the process and may improve speed and efficiency of the process and conserve computing resources (e.g., processors, memory, and/or the like associated with attempting to continuously connect to a network). Furthermore, implementations described herein use a wearable device to perform tasks or roles that were not previously performed or were previously performed using human input. For example, the wearable device enables checking a balance available for the wearable device, adding funds to the wearable device, and performing offline transactions with the wearable device. Finally, the wearable enables conservation of computing resources (e.g., processors, memory, and/or the like) that would otherwise be wasted in attempting to continuously connect to a network.

As indicated above, FIGS. 1A-1I are provided merely as examples. Other examples are possible and may differ from what was described with regard to FIGS. 1A-1I.

Figure 2:
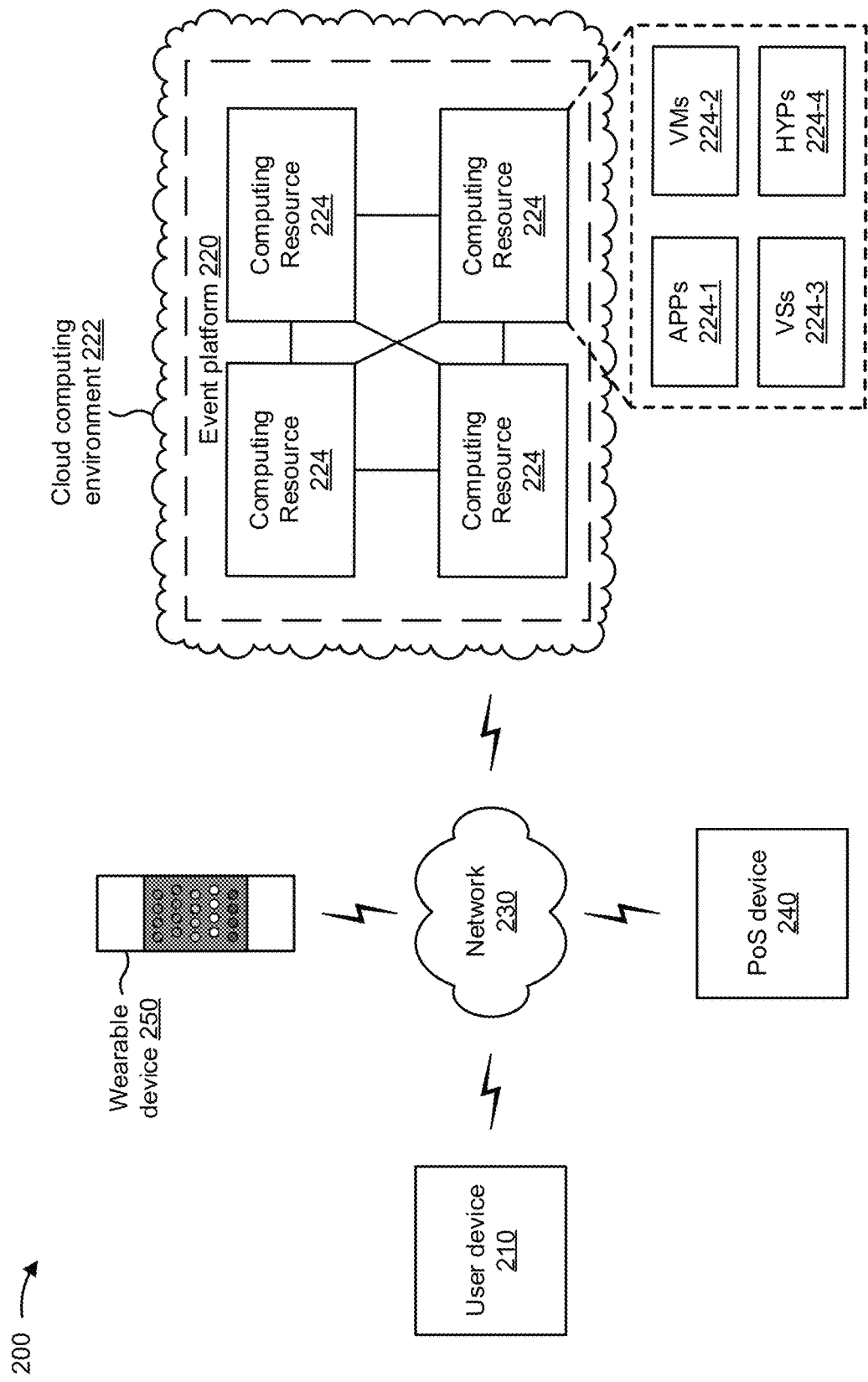
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, an event platform 220, a network 230, a PoS device 240, and a wearable device 250. Devices of environment 200 may interconnect via wired connections, wireless connections, or a combination of wired and wireless connections.

User device 210 includes one or more devices capable of receiving, generating, storing, processing, and/or providing information, such as information described herein. For example, user device 210 may include a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, user device 210 may receive information from and/or transmit information to event platform 220, PoS device 240, and/or wearable device 250.

Event platform 220 includes one or more devices that provide a wearable device application to user device 210 and that enables wearable device 250 to access an event, pay for offline transactions at the event, and provide a visual light display. In some implementations, event platform 220 may be designed to be modular such that certain software components may be swapped in or out depending on a particular need. As such, event platform 220 may be easily and/or quickly reconfigured for different uses. In some implementations, event platform 220 may receive information from and/or transmit information to one or more user devices 210, PoS devices 240, and/or wearable devices 250.

In some implementations, as shown, event platform 220 may be hosted in a cloud computing environment 222. Notably, while implementations described herein describe event platform 220 as being hosted in cloud computing environment 222, in some implementations, event platform 220 may not be cloud-based (i.e., may be implemented outside of a cloud computing environment) or may be partially cloud-based.

Cloud computing environment 222 includes an environment that hosts event platform 220. Cloud computing environment 222 may provide computation, software, data access, storage, etc. services that do not require end-user knowledge of a physical location and configuration of system(s) and/or device(s) that hosts event platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host event platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by user device 210, PoS device 240, and/or wearable device 250. Application 224-1 may eliminate a need to install and execute the software applications on user device 210, PoS device 240, and/or wearable device 250. For example, application 224-1 may include software associated with event platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., an operator of event platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

PoS device 240 includes a device that conducts and completes a transaction at a time and place of the transaction. PoS device 240 may calculate an amount owed by a customer, may indicate that amount, may prepare an invoice for the customer, and may indicate options for the customer to make payment. PoS device 240 may be point at which a customer makes a payment to a merchant in exchange for goods or after provision of a service. After receiving payment, PoS device 240 may issue a printed or an electronic receipt for the transaction.

Wearable device 250 may include a device that is worn by a user, attached to an item of clothing of the user, attached to accessories of the user (e.g., a backpack), and/or the like. In some implementations, wearable device 250 may provide access to an event, may pay for offline transactions at the event, may provide a visual light display, and/or the like. In some implementations, wearable device 250 may include a band to be worn around a wrist of a user and a housing connected to the band. Alternatively, the housing of wearable device 250 may be connected to a mechanism other than the band, such as a lanyard, a connector for connecting to a backpack or an article of clothing, and/or the like. The housing may support multiple LEDs, and may house a NFC component, security element, a wireless component, and a network receiver component.

Each LED may include a two-lead semiconductor light source, such as a p-n junction diode that emits light when activated. In some implementations, each LED may emit a particular color or a plurality of different colors. In some implementations, when a suitable voltage is applied to the leads of each LED, electrons may recombine with electron holes within each LED, releasing energy in the form of photons. This effect is called electroluminescence, and a color of light may corresponding to an energy of the photon, and may be determined by an energy band gap of the semiconductor.

NFC component may include a component supporting communication protocols that enable wearable device 250 and another device (e.g., user device 210, PoS device 240, and/or the like) to establish communication by bringing wearable device 250 and other device within a particular distance of each other. In some implementations, the NFC component may enable wearable device 250 to be used with contactless payment systems (e.g., PoS device 240) so that wearable device 250 can perform transactions (e.g., make contactless payments).

The security element may include a component that generates a secure token (e.g., a one-time password (OTP) token) when wearable device 250 is utilize to perform transactions (e.g., make contactless payments). In some implementations, the secure token may provide authentication for the user when the user accesses the funds on wearable device 250, accesses accounts associated with the user (e.g., bank accounts, credit card accounts, debit card accounts, and/or the like), and/or the like. In some implementations, when the NFC component is energized by a contactless payment system (e.g., when wearable device 250 is being used to conduct a transaction for a particular amount of funds), the NFC component being energized may cause the security element to automatically generate a secure token for the particular amount of funds. The security element may provide the secure token to the contactless payment system via the NFC component.

The wireless component may include component that supports a particular wireless technology standard (e.g., Bluetooth, Zignee, WiFi, and/or the like), and enables wearable device 250 to communicate wirelessly with other devices (e.g., user device 210) over short distances. In some implementations, the wireless component may enable wearable device 250 to communicate with user device 210 so that user device 210 may display information associated with wearable device 250 (e.g., a ticket number identifier, an amount of available funds, event access privileges, and/or the like).

The network receiver component may include a component supporting network communication protocols (e.g., wide area network (WAN) protocols, cellular network protocols, and/or the like) that enable wearable device 250 to connect to a network, perform online transactions, and/or the like. In some implementations, the network receiver component may enable wearable device 250 to connect with a network and receive event information (e.g., music information, sound information, and/or the like), information to configure the LEDs, information to synchronize the LEDs with the event information, and/or the like.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
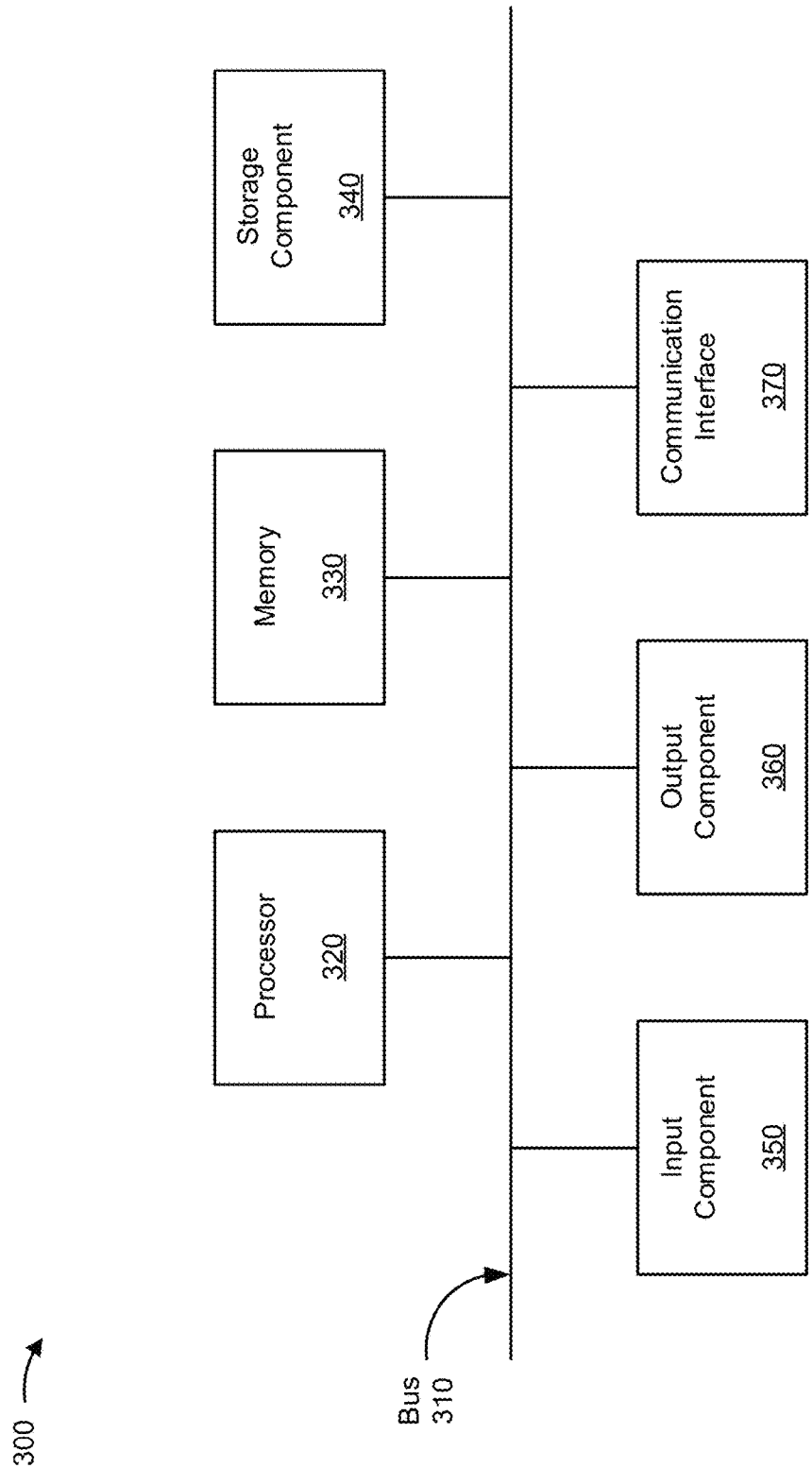
FIG. 3 is a diagram of example components of one or more devices of FIG. 2.

FIG. 3 is a diagram of example components of a device 300. Device 300 may correspond to user device 210, event platform 220, computing resource 224, PoS device 240, and/or wearable device 250. In some implementations, user device 210, event platform 220, computing resource 224, PoS device 240, and/or wearable device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
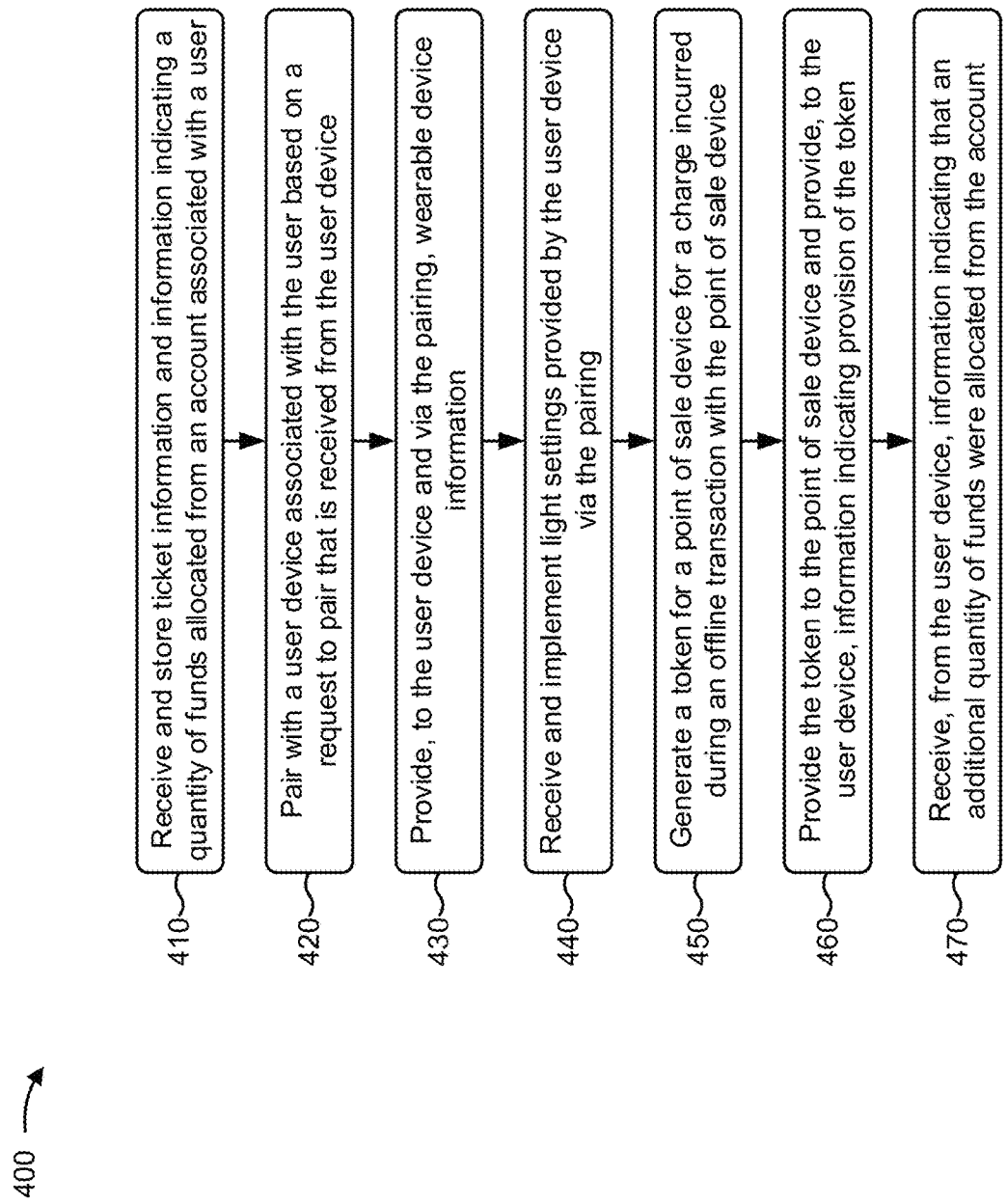
FIG. 4 is a flow chart of an example process for utilizing a wearable device to access an event, pay for offline transactions at the event, and provide a visual light display.

FIG. 4 is a flow chart of an example process 400 for utilizing a wearable device to access an event, pay for offline transactions at the event, and provide a visual light display. In some implementations, one or more process blocks of FIG. 4 may be performed by wearable device 250. In some implementations, one or more process blocks of FIG. 4 may be performed by another device or a group of devices separate from or including wearable device 250, such as user device 210, event platform 220, and/or PoS device 240.

As shown in FIG. 4, process 400 may include receiving and storing ticket information and information indicating a quantity of funds allocated from an account associated with a user (block 410). For example, wearable device 250 may receive and store ticket information and information indicating a quantity of funds allocated from an account associated with a user. In some implementations, user device 210 may provide, to event platform 220, a request for a ticket and an account to utilize for purchasing the ticket. In some implementations, user device 210 may provide, to event platform 220, a request to add funds to the ticket. In some implementations, event platform 220 may charge the account for the ticket, and may generate a ticket number based on the request for the ticket and the account to utilize for purchasing the ticket. Event platform 220 may charge the amount of funds to the account (e.g., associated with a user of user device 210), and may add the funds to the ticket. In some implementations, the ticket may be in the form of wearable device 250.

In some implementations, event platform 220 may provide, to wearable device 250, information indicating the ticket number and the amount of funds allocated to wearable device 250 from the account. In such implementations, wearable device 250 may receive the information indicating the ticket number and the amount of funds allocated to wearable device 250 from the account, and may store the information indicating the ticket number and the amount of funds allocated to wearable device 250 from the account. In some implementations, wearable device 250 may receive other information from event platform 220 (e.g., information associated with the event, information indicating access privileges for the event, information indicating light settings for the wearable device, and/or the like), and may store the other information.

As further shown in FIG. 4, process 400 may include pairing with a user device associated with the user based on a request to pair received from the user device (block 420). For example, wearable device 250 may pair with user device 210 associated with the user based on a request to pair received from user device 210. In some implementations, user device 210 may execute a wearable device application, and the wearable device application may provide a user interface that inquires whether the user wants to pair user device 210 with wearable device 250. In some implementations, if the user wants to pair user device 210 with wearable device 250, the wearable device application may cause user device 250 to provide, to wearable device 250, a signal requesting pairing with wearable device 250. In some implementations, the wireless component of wearable device 250 may receive the signal requesting the pairing. In some implementations, wearable device 250 may automatically accept the pairing with user device 210 and may provide a signal, indicating that the pairing is accepted, to user device 210. In such implementations, user device 210 and wearable device 250 may be paired and may communicate with each other. In some implementations, wearable device 250 may require provision of the ticket information or some other verification before pairing with user device 210.

As further shown in FIG. 4, process 400 may include providing, to the user device and via the pairing, wearable device information (block 430). For example, wearable device 250 may provide, to user device 210 and via the pairing, wearable device information. In some implementations, once wearable device 250 and user device 210 are paired, wearable device 250 may automatically provide the wearable device information to user device 210. User device 210 may receive the wearable device information, and may provide the wearable device information for display to the user. In some implementations, the wearable device information may include the ticket number associated with wearable device 250, an amount of funds allocated to wearable device 250, information indicating event access privileges, information enabling user device 210 to set up the lights (e.g., the LEDs) of wearable device 250, information enabling user device 210 add funds to wearable device 250, and/or the like. In some implementations, the user may utilize the wearable device application to select particular wearable device information and view detailed information associated with the particular wearable device information.

For example, if the user utilizes the wearable device application to select the information indicating the event access privileges, user device 210 may provide, to wearable device 510, information indicating access privileges for wearable device 250, and hence the user, at the event. User device 210 may provide, for display to the user, the information indicating the access privileges for wearable device 250 at the event.

As further shown in FIG. 4, process 400 may include receiving and implementing light settings provided by the user device via the pairing (block 440). For example, wearable device 250 may receive and implement light settings provided by user device 210 via the pairing. In some implementations, if the user selects the information enabling user device 210 to set up the lights of wearable device 250, user device 210 may provide for display light settings that the user may specify. For example, the user may specify light settings associated with a color of the lights, a pattern for the lights, synchronization of the lights with music, and/or the like. In some implementations, user device 210 may provide the light settings to wearable device 250, and wearable device 250 may receive and implement the light settings. In some implementations, the light settings may cause wearable device 250 to display a particular color or multiple different colors. In some implementations, the light settings may cause wearable device 250 to display a particular pattern, multiple different patterns, an image, multiple different images, and/or the like.

In some implementations, the light settings may cause wearable device 250 to synchronize a display of the lights of wearable device 250 with sound (e.g., music, a video, a speech, and/or the like) being played at the event (e.g., a concert, a music festival, and/or the like). In such implementations, the network receiver component of wearable device 250 may connect with a network that provides information associated with the sound being played at the event. The information associated with the sound being played at the event may cause different lights of wearable device 250 to be illuminated at different times. In some implementations, the information associated with the sound being played may cause the lights of wearable device 250 to provide a display resembling an equalizer.

As further shown in FIG. 4, process 400 may include generating a token for a point of sale device for a charge incurred during an offline transaction with the point of sale device (block 450). For example, wearable device 250 may generating a token for PoS device 240 for a charge incurred during an offline transaction with PoS device 240. In some implementations, the user may perform an offline transaction (e.g., make a purchase) with PoS device 240 at the event. The user may utilize wearable device 250 to pay for the purchase, and PoS device 240 may provide a charge for the purchase to wearable device 250. In some implementations, the NFC component of wearable device 250 may receive the charge from PoS device 240. In some implementations, the receipt of the charge by the NFC component of wearable device 250 may cause the security element of wearable device 250 to automatically generate a secure token as payment for the charge. In some implementations, the receipt of the charge from PoS device 240 may cause the NFC component of wearable device 250 to become energized, and the energizing of the NFC component may cause the security element of wearable device 250 to automatically generate the secure token.

As further shown in FIG. 4, process 400 may include providing the token to the point of sale device and providing, to the user device, information indicating provision of token (block 460). For example, wearable device 250 may provide the token to PoS device 240 and may provide, to user device 210, information indicating provision of token to PoS device 240. In some implementations, wearable device 250 may provide a secure token to PoS device 240 as payment for the charge. In some implementations, the secure token may include information identifying the account associated with wearable device 250 and an amount to charge the account. In some implementations, PoS device 240 may receive the secure token, but may be unable to redeem the token and receive payment since there is no network communication at the event. However, PoS device 240 may store the secure token, and may utilize the secure token to receive payment at a later time when PoS device 240 is connected to a network.

In some implementations, wearable device 250 may provide, to user device 210, information indicating that the secure token was provided to PoS device 240. In some implementations, user device 210 may receive the information indicating that the secure token was provided to PoS device 240, and may deduct the amount paid by wearable device 250 from the funds allocated to wearable device 250.

As further shown in FIG. 4, process 400 may include receiving, from the user device, information indicating that an additional quantity of funds were allocated from the account (block 470). For example, wearable device 250 may receive, from user device 210, information indicating that an additional quantity of funds were allocated from the account of the user to wearable device 250. In some implementations, user device 210 may provide, for display to the user, information requesting whether the user wishes to allocate more funds to wearable device 250. In some implementations, the user may wish to allocate more funds to wearable device 250, and may indicate this desire via user device 210.

In some implementations, based on the desire of the user to allocate more funds to wearable device 250, user device 210 may provide, for display to the user, information requesting an amount of funds to allocate to wearable device 250. In some implementations, the user may indicate that the user wishes to allocate a particular amount to wearable device 250, and user device 210 may update the balance on wearable device 250 based the user allocating the particular amount to wearable device 250. In some implementations, user device 210 may provide, to wearable device 250, information indicating that wearable device 250 has an updated balance of funds available for purchases at the event. In some implementations, wearable device 250 may receive the information indicating that the wearable device has an updated balance (e.g., with an additional quantity of funds) available for purchases at the event. In some implementations, user device 210 may be unable to connect with the account associated with wearable device 250 and allocate the particular amount since there is no network communication at the event. However, in such implementations, user device 210 may store information indicating that the particular amount was allocated to wearable device 250, and may utilize such information to withdraw the particular amount from the account at a later time when user device 210 is connected to a network.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Some implementations described herein include a wearable device that provides access to an event, pays for offline transactions at the event, and provides a visual light display. The wearable device may include a wireless component, a NFC component, a security element, a network receiver component, and multiple LEDs. The wireless component may enable the wearable device to connect to a user device (e.g., a mobile phone) so that a user of the wearable device may check a balance of funds available to the wearable device and may add to the balance of funds. The NFC component and the security element may enable the wearable device to be used to pay for offline transactions at the event. The network receiver component and the multiple LEDs may enable the wearable device to provide a variety of light displays that may be synchronized to sounds (e.g., music) associated with the event.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a first device, information indicating that a token was provided by a second device,
      wherein the token is associated with an offline transaction that occurred with the second device,
      wherein the token is generated based on a signal indicating that the offline transaction occurred, and
      wherein the token is utilized for payment of the offline transaction via an online transaction at a later time;
   updating, by the first device and based on the information indicating that the token was provided by the second device, an amount associated with an allocated fund associated with the second device; and
   providing, by the first device and to the second device, information associated with the updated allocated fund.

2. The method of claim 1, wherein updating the amount associated with the allocated fund comprises:
   modifying, based on another offline transaction, the amount associated with the allocated fund; and
   providing information associated with the other offline transaction via another online transaction at another later time,
      wherein the information causes an update to an account associated with the first device.

3. The method of claim 1, further comprising:
   providing an identifier associated with a transaction; and
   receiving, based on the identifier, an application that is utilized to communicate with the second device.

4. The method of claim 1, further comprising:
   selecting access privilege information indicating venues accessible via the second device; and
   providing the access privilege information.

5. The method of claim 1, further comprising:
   providing information requesting whether to allocate additional funds to the allocated fund;
   receiving an indication to allocate additional funds to the allocated fund; and
   providing, information indicating that the additional funds were allocated to the allocated fund.

6. The method of claim 1, further comprising:
   receiving an application that is utilized to configure the second device to at least one of:
      provide location information based on another signal received at a particular location when the second device was in the vicinity of the particular location, or
      control whether a type of transaction is authorized by the second device.

7. The method of claim 1, wherein the second device is a wearable device.

8. A first device, comprising:
   one or more memories; and
   one or more processors, coupled to the one or more memories, configured to:
      receive information indicating that a token was provided,
         wherein the token is generated based on a signal indicating that an offline transaction occurred with a second device, and
         wherein the token is utilized for payment of the offline transaction via an online transaction at a later time;
      update, based on the information indicating that the token was provided by the second device, an amount associated with an allocated fund associated with the second device; and
      provide, to the second device, information associated with the updated allocated fund.

9. The first device of claim 8, wherein the one or more processors, to update the amount associated with the allocated fund, are configured to:
- modify, based on another offline transaction, the amount associated with the allocated fund; and
- provide information associated with the other offline transaction via another online transaction at another later time,
  - wherein the information causes an update to an account associated with the first device.

10. The first device of claim 8, wherein the one or more processors are further configured to:
- provide an identifier associated with a transaction; and
- receive, based on the identifier, an application that is utilized to communicate with the second device.

11. The first device of claim 8, wherein the one or more processors are further configured to:
- select access privilege information indicating venues accessible via the second device; and
- provide the access privilege information.

12. The first device of claim 8, wherein the one or more processors are further configured to:
- provide information requesting whether to allocate additional funds to the allocated fund;
- receive an indication to allocate additional funds to the allocated fund; and
- provide information indicating that the additional funds were allocated to the allocated fund.

13. The first device of claim 8, wherein the one or more processors are further configured to:
- receive an application that is utilized to configure the second device to at least one of:
  - provide location information based on another signal received at a particular location when the second device was in the vicinity of the particular location, or
  - control whether a type of transaction is authorized by the second device.

14. The first device of claim 8, wherein the second device is a wearable device.

15. A non-transitory computer-readable medium storing a set of instructions, the set of instructions comprising:
- one or more instructions that, when executed by one or more processors of a first device, cause the first device to:
  - receive information indicating that a token was provided by a second device,
    - wherein the token is generated based on a signal indicating that an offline transaction occurred with a second device, and
    - wherein the token is utilized for payment of the offline transaction via an online transaction at a later time;
  - update, based on the information indicating that the token was provided by the second device, an amount associated with an allocated fund associated with the second device; and
  - provide, to the second device, information associated with the updated allocated fund.

16. The non-transitory computer-readable medium of claim 15, wherein the one or more instructions, that cause the first device to update the amount associated with the allocated fund, cause the first device to:
- modify, based on another offline transaction, the amount associated with the allocated fund; and
- provide information associated with the other offline transaction via another online transaction at another later time,
  - wherein the information causes an update to an account associated with the first device.

17. The non-transitory computer-readable medium of claim 15, wherein the one or more instructions further cause the first device to:
- provide an identifier associated with a transaction; and
- receive, based on the identifier, an application that is utilized to communicate with the second device.

18. The non-transitory computer-readable medium of claim 15, wherein the one or more instructions further cause the first device to:
- select access privilege information indicating venues accessible via the second device; and
- provide the access privilege information.

19. The non-transitory computer-readable medium of claim 15, wherein the one or more instructions further cause the first device to:
- provide information requesting whether to allocate additional funds to the allocated fund;
- receive an indication to allocate additional funds to the allocated fund; and
- provide information indicating that the additional funds were allocated to the allocated fund.

20. The non-transitory computer-readable medium of claim 15, wherein the one or more instructions further cause the first device to:
- receive an application that is utilized to configure the second device to at least one of:
  - provide location information based on another signal received at a particular location when the second device was in the vicinity of the particular location, or
  - control whether a type of transaction is authorized by the second device.

* * * * *